(12) United States Patent
Strahle

(10) Patent No.: US 10,429,812 B2
(45) Date of Patent: *Oct. 1, 2019

(54) CLEAN STATUS INDICATOR

(71) Applicant: David A. Strahle, Fenton, MI (US)

(72) Inventor: David A. Strahle, Fenton, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,540

(22) Filed: Nov. 27, 2017

(65) Prior Publication Data

US 2018/0088549 A1     Mar. 29, 2018

Related U.S. Application Data

(63) Continuation-in-part of application No. 14/822,523, filed on Aug. 10, 2015, now Pat. No. 10,017,894.

(51) Int. Cl.

| A47L 15/42 | (2006.01) |
| G05B 19/05 | (2006.01) |
| D06F 33/02 | (2006.01) |
| D06F 39/00 | (2006.01) |
| D06F 39/12 | (2006.01) |

(Continued)

(52) U.S. Cl.
CPC ............ *G05B 19/05* (2013.01); *A47L 15/006* (2013.01); *A47L 15/4253* (2013.01); *A47L 15/4257* (2013.01); *A47L 15/4293* (2013.01); *A47L 15/4295* (2013.01); *D06F 33/02* (2013.01); *D06F 39/005* (2013.01); *D06F 39/125* (2013.01); *A47L 15/50* (2013.01); *A47L 2301/06* (2013.01); *A47L 2401/04* (2013.01); *A47L 2401/18* (2013.01); *A47L 2501/26* (2013.01); *D06F 2202/04* (2013.01); *D06F 2202/10* (2013.01); *D06F 2216/00* (2013.01); *G05B 2219/13007* (2013.01); *G05B 2219/13051* (2013.01); *G05B 2219/2613* (2013.01); *G05B 2219/37357* (2013.01)

(58) Field of Classification Search
CPC ............ A47L 15/4253; A47L 15/4257; A47L 15/4293; A47L 15/4295
See application file for complete search history.

(56) References Cited

U.S. PATENT DOCUMENTS

| 4,140,294 A * | 2/1979 | Zwarts | .................... A47H 1/122 248/265 |
| 4,955,569 A * | 9/1990 | Hottmann | ................. F16M 7/00 248/188.2 |

(Continued)

*Primary Examiner* — Vincent H Tran
(74) *Attorney, Agent, or Firm* — Loomis, Ewert, Parsley, Davis & Gotting PC; Mikhail Murshak

(57) ABSTRACT

An anchoring system for use with a device having a clean status indicator may include at least one first slide component having at least one slot and at least one second slide component disposed within the at least one slot configured to move in relation to the at least one first slide component along at least a first axis extending along a length of the at least one slot, a second axis extending along a width of the at least one slot, and a third axis extending perpendicular to the first axis and the second axis. At least one of the at least one first slide component and the at least one second slide component may be configured to be secured to at least one of the device and a rigid support structure immediately adjacent to the device to allow for a controlled degree of movement of the device along at least the first axis, the second axis, and the third axis.

22 Claims, 12 Drawing Sheets

(51) Int. Cl.
*A47L 15/00* (2006.01)
*A47L 15/50* (2006.01)

(56) References Cited

U.S. PATENT DOCUMENTS

| | | | | |
|---|---|---|---|---|
| 5,584,462 A * | 12/1996 | Reese | ............... | A47G 1/202 248/339 |
| 6,773,080 B2 * | 8/2004 | Chen | ............... | A47B 57/40 211/26 |
| 6,910,665 B2 * | 6/2005 | Avendano | ............... | E05D 11/00 16/284 |
| 6,991,384 B1 * | 1/2006 | Davis | ............... | F16M 11/041 248/187.1 |
| 7,478,508 B2 * | 1/2009 | Peterson | ............... | E04B 2/96 248/300 |
| 7,744,177 B2 * | 6/2010 | Peng | ............... | A47B 88/43 312/223.1 |
| 8,550,415 B2 * | 10/2013 | Sculler | ............... | H05K 5/0017 248/291.1 |
| 8,746,639 B2 * | 6/2014 | Nguyen | ............... | F16M 11/10 248/205.1 |
| 9,125,502 B2 * | 9/2015 | Gwag | ............... | A47F 5/0884 |
| 9,510,726 B1 * | 12/2016 | Peay | ............... | A47L 15/427 |
| 2006/0284038 A1 * | 12/2006 | Hartman | ............... | G06F 1/183 248/298.1 |
| 2007/0290112 A1 * | 12/2007 | Orth | ............... | H04R 1/026 248/317 |
| 2009/0184302 A1 * | 7/2009 | Begin | ............... | E04F 11/1812 256/65.04 |
| 2011/0157805 A1 * | 6/2011 | Mi | ............... | F16M 11/041 361/679.22 |
| 2012/0138758 A1 * | 6/2012 | Graber | ............... | E04H 17/1421 248/221.11 |
| 2013/0014330 A1 * | 1/2013 | Romero | ............... | A43D 5/02 12/123 |
| 2013/0264441 A1 * | 10/2013 | Zehrer | ............... | F16M 13/00 248/201 |
| 2015/0196189 A1 * | 7/2015 | Shaffer | ............... | A47L 15/502 312/228.1 |
| 2015/0230648 A1 * | 8/2015 | Richards | ............... | A47H 1/142 248/645 |
| 2016/0174805 A1 * | 6/2016 | Fischer | ............... | A47L 15/50 134/164 |
| 2017/0045871 A1 * | 2/2017 | Strahle | ............... | A47L 15/4293 |

* cited by examiner

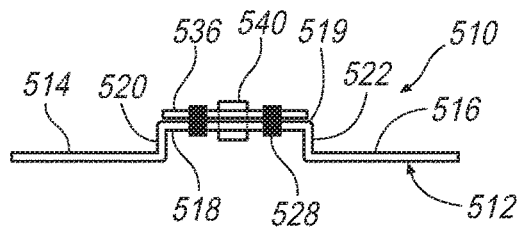
FIG. 8A
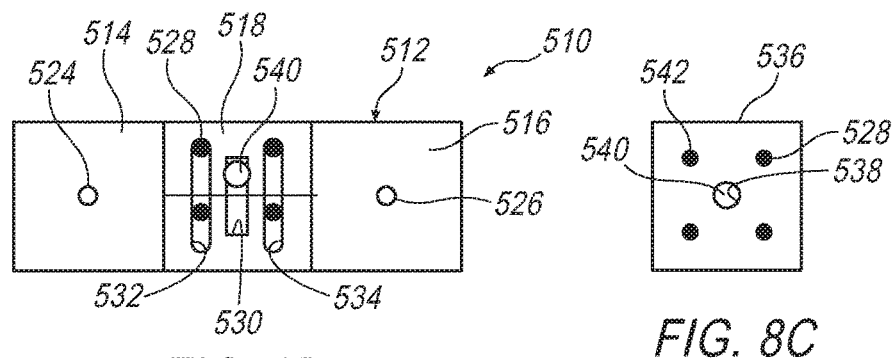
FIG. 8B
FIG. 8C
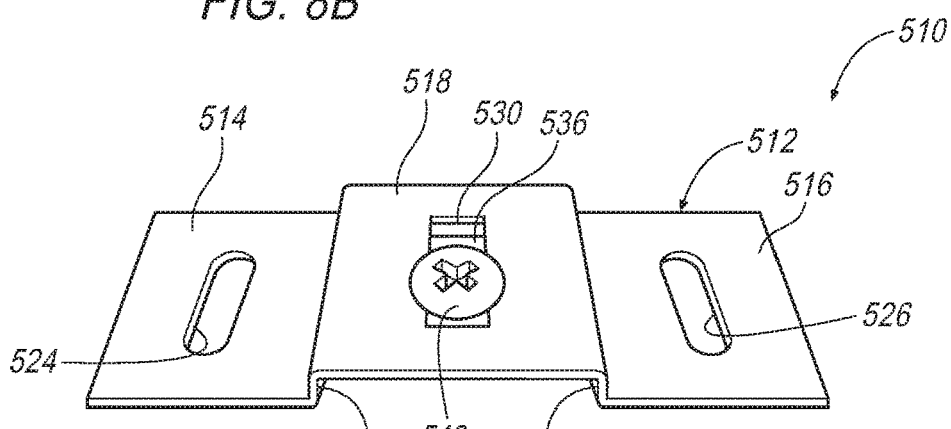
FIG. 9A
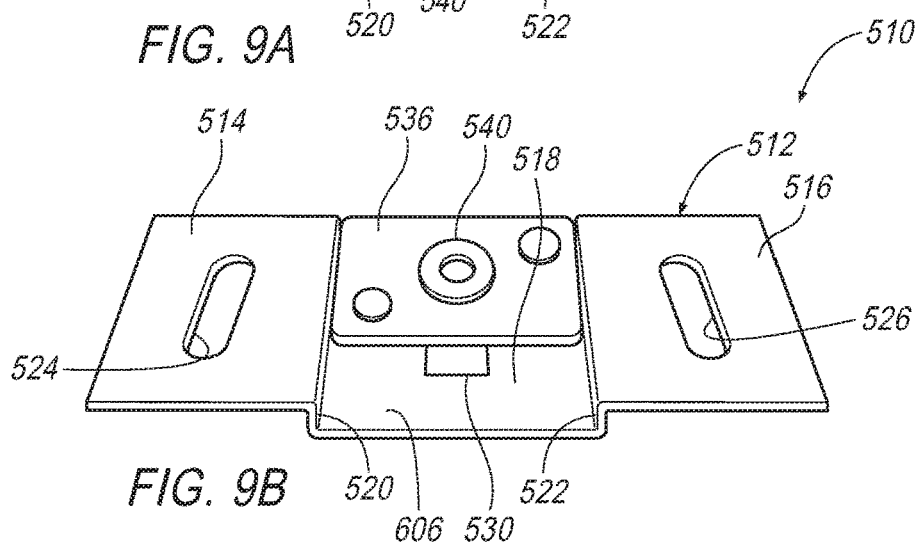
FIG. 9B

CLEAN STATUS INDICATOR

CROSS-REFERENCE TO RELATED APPLICATIONS

This application is a continuation-in-part of U.S. patent application Ser. No. 14/822,523 filed on Aug. 10, 2015. The present application claims priority to the proceeding application which is hereby incorporated herein by reference in its entirety.

BACKGROUND

Electronic devices such as automatic dishwashers are utilized to clean and sanitize items such as dishes, utensils, and other household items placed within. Such devices utilize an electronic controlled system of cycles that undertake at least a subset of wash, rinse and dry the objects placed within. The time required to run through a standard cleaning set of cycles, however, can encompass a substantial time. Therefore, it is unusual for users to sit and wait for the device to finish. Rather, it is commonplace for users to move onto other tasks while the device operates. Often, upon returning to the device, a user is left contemplating if it was run or not. Although manual methods such as feeling for the warmth of the dishes or looking for water pooling on the top of glasses in the case of a dishwasher may give some indication, it is often difficult to tell if the cleaning cycles were run and the contents are clean. Moreover, the method is hardly foolproof. For example, in the case of a dishwasher, an indication of slightly wet items may not be very helpful if the objects were rinsed prior to being loaded into the dishwasher.

Even when a user is aware that the device has completed the cleaning process, the process of unloading may become interrupted by other more pressing matters. Upon return, the user may be confronted with a partially loaded device such as a dishwasher and no idea of its clean/dirty status. Additionally, in large families or shared residences it is not unknown for an individual to open a device and remove only a subset of the retained items such as a glass, plate, or utensil that is immediately required. When another individual opens the device, they are again left attempting to discern the status of the contents. The tendency is often to simply run the device through another set of cycles to be safe. This is uneconomical and inefficient.

There have been advances in device designs to monitor the clean/dirty status of their contents, but these designs are incorporated into the physical structure of the new devices. Additionally, they are often defeated as soon as the door is opened for initial unloading and do not capture the concept of partial unloading at a first time and a further unloading at a second later time. Moreover, these devices are only available upon the purchase of a new device. The longevity of devices such as dishwashers means that these advances in technology won't find their way into the majority of people's kitchens for years to come. There are also products that may be inserted along with the dishes into the dishwasher washing compartment to indicate status. But similar to the manual checking described above, they require a physical interaction by the user that may be overlooked.

It may be desirable for an improved status indicator solution that may be installed and operated on the large number of existing devices presently operating in the market. It may also be desirable for a status indicator solution that minimizes user inputs and takes into consideration partial unloading of a device contents whether the device is new or pre-existing in the marketplace.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 8A is an exemplary illustration of a side view of a mounting bracket for use in combination with the sample device shown in FIG. 1A;

FIG. 8B is an exemplary illustration of a bottom view of the mounting bracket shown in FIG. 8A;

FIG. 8C is an exemplary illustration of a top view of the mounting bracket shown in FIG. 8A, with portions removed;

FIG. 9A is a top view of another mounting bracket for use in combination with the sample device shown in FIG. 1A;

FIG. 9B is a bottom view of the mounting bracket illustrated in FIG. 9A;

DETAILED DESCRIPTION

A cleanliness status indicator such as that which may be used with a dishwasher or a washing machine is disclosed with the capability to be installed using either new devices or pre-existing devices and automatically indicate the clean/dirty status of the objects within the washing compartment. Moreover, the disclosed status indicator provides a customizable sensor system that may be tailored to individual devices and the habits of the individual users that install or use it. The disclosed status indicator further guards against dish removal/loading errors twenty-four hours a day by monitoring the dishwasher or washing machine, without human intervention, to reset the indicator each time contents from the dishwasher are removed after cleaning or added once dirty. The disclosed status indicator may account for a full range of operator variability of a device such as a dishwasher including, but not limited to: an operator emptying a full dishwasher in one step by emptying the racks in any sequence; an operator emptying a partial amount of dishes from either or both racks in any order as a result of operator interruptions such as the operator answering the telephone, distraction of the operator, vacation of the operator, etc. for an indefinite period of time; an operator opening and closing the dishwasher door repeatedly to remove one or more items within the dishwasher at a time; an operator emptying silverware from a basket within the dishwasher or removal of the entire basket containing the silverware to empty the silverware from the dishwasher; and an operator emptying dishes directly from the dishwasher racks or removing one or both racks entirely from the dishwasher and then emptying the dishes from the racks. The disclosed status indicator may also guard against mistakes made by an operator of adding dirty dishes to a dishwasher containing clean dishes and removal of dirty dishes before the dishes are properly clean. The disclosed clean status indicator may also allow for variations of speed of the removal of each item within the dishwasher by the operator and may account for multiple operators unloading and loading items into the dishwasher at the same time. The disclosed clean status indicator clearly identifies both the clean and dirty state of the dishwasher by, for example, two different colored light identifiers. The disclosed clean status indicator may also account for temperature changes within the environment such as within a house, restaurant, or office building that may lead to misinformation on the clean or dirty status of the dishwasher such as an air conditioner or heating failure. Further, the disclosed clean status indicator correctly identifies "rinse and hold cycles" as "dirty" versus completed cleaning cycles as "clean." The disclosed clean status indicator may further include backup limits as a fail safe, which may protect the primary logic within the clean status indicator.

Figure 1A:
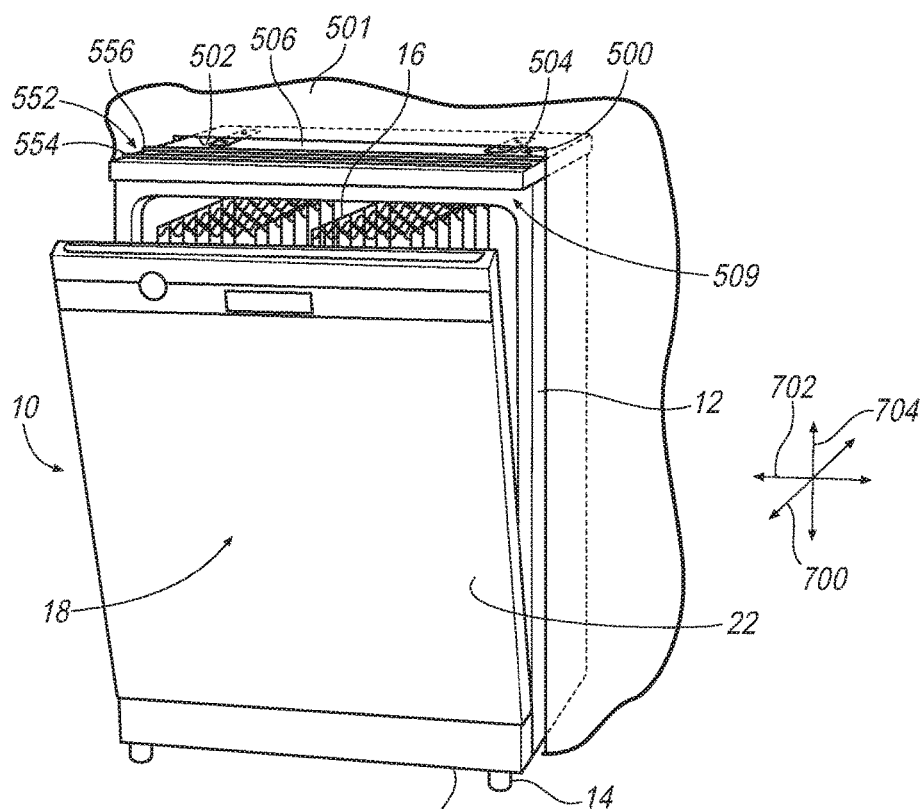
FIG. 1a is an exemplary illustration of a dishwasher as a sample device in accordance with the prior art.
Figure 1B:
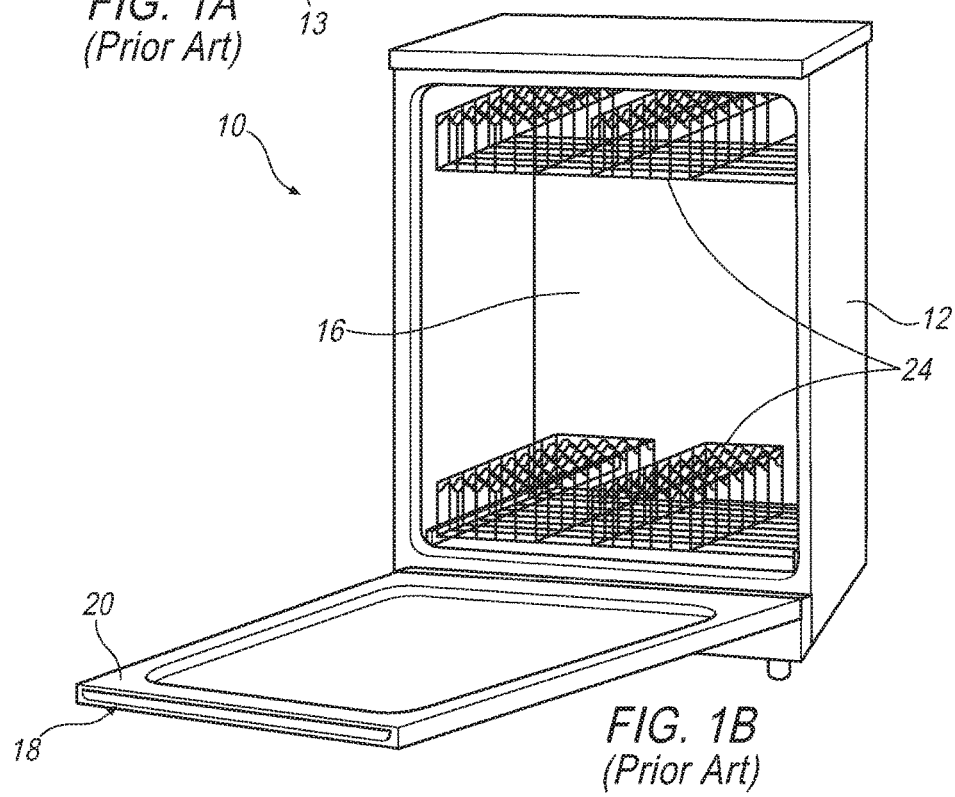
FIG. 1b is an exemplary illustration of the dishwasher illustrated in FIG. 1a in accordance with the prior art, the dishwasher illustrated in an open position.

Referring now to FIG. 1a, a device such as a dishwasher 10 as known in the prior art is shown. The dishwasher 10 is intended for illustrative purposes only and it is understood that a wide variety of shapes and configurations are known. The dishwasher 10 includes a frame 12 with a base 13 having supporting feet 14. Although the supporting feet 14 may comprise adjustable height feet components, a variety of differing supporting feet 14 structures are known. The frame 12 defines a washing compartment 16 in its interior. The dishwasher 10 typically includes a door 18 having an interior door surface 20 (FIG. 1b) and an exterior door surface 22 (FIG. 1a). The dishwasher 10 may also include one or more movable racks 24 that allow for the storage of dishes, utensils, and other household objects for cleaning.

The dishwasher 10 may also include an anchoring system 500 as known in the prior art to secure the dishwasher 10 to a rigid support structure 501 including, but not limited to, a counter or cabinet wall having a lower surface 502 immediately adjacent to the top surface 506 and/or side surface of the dishwasher 10. The anchoring system 500 typically includes at least one top bracket 504 secured to the top surface 506 of the frame 12 of the dishwasher 10 and may include one or more corner brackets, side brackets, side screws, etc. (not shown). The anchoring system 500 rigidly secures the dishwasher 10 to the lower surface 502 or side surface of the rigid support structure 501 via at least one mechanical fastener.

Figure 2:
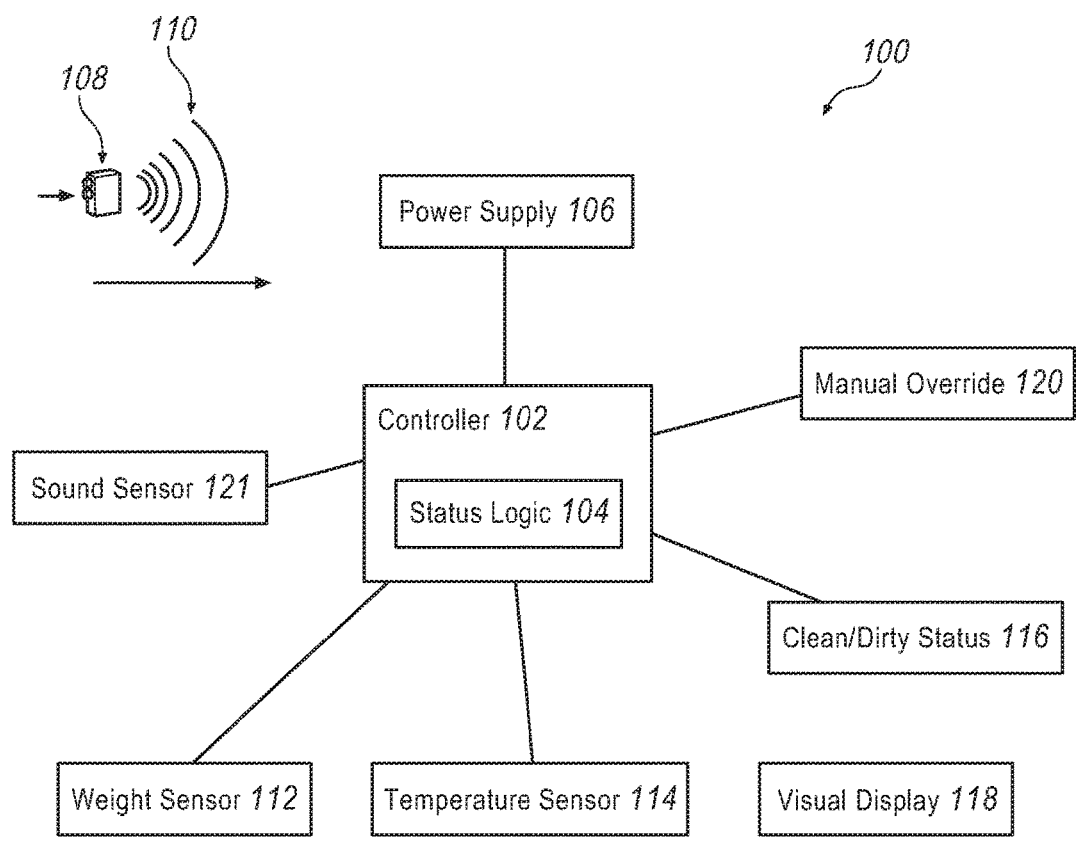
FIG. 2 is an exemplary schematic of a clean status indicator for a dishwasher acting as a sample device.

Referring now to FIG. 2, an exemplary schematic of a clean status indicator 100 is shown. The status indicator 100 may include a controller 102 including a status logic 104 embedded therein. The controller 102 may be powered by a power supply 106. In one exemplary arrangement, the power supply 106 may comprise a user replaceable battery. In another exemplary arrangement the power supply 106 may comprise a rechargeable battery. In still another exemplary arrangement, the power supply may comprise a wireless charging power supply. The use of a wireless charging power supply allows the status indicator 100 to be mounted on an existing dishwasher 10 without requiring ongoing battery replacement or recharging requirements. The wireless charging power supply 106 may be charged utilizing a remote positioned energy transfer unit 108 transferring energy to the power supply 106. In one exemplary arrangement, the wireless charging power supply 106 may receive energy from ambient WIFI signals or similar wireless charging system 110 that are commonly present in most household environments. This may significantly improve the ease of use and reduce maintenance.

The status indicator 100 may also include at least one weight sensor 112 in communication with the controller 102. The at least one weight sensor 112 is configured to sense the weight of objects within the washing compartment 16 and changes in weight as objects are inserted and removed from the washing compartment 16. In some cases, as discussed below, it may be desirable to also measure the addition of water to the washing compartment. In an exemplary arrangement, the weight sensor 112 may be a strain gauge including, but not limited to, a "Micro Load Cell" strain gauge. A strain gauge may have a high sensitivity to changes in weight, which may allow the weight sensor 112 to detect subtle changes in weight that may occur as loading/unloading of dishes, utensils, and other household objects occurs in the case of a dishwasher. This may improve the performance and accuracy of the clean status indictor 100. A strong adhesive base may be used to restrict the weight sensor 112 from sliding on the floor, once the weight sensor 112 is secured to the dishwasher 10. This may allow for the weight readings to be reproducible and consistent. Strain gauges may also have low comprehensive error, low non-linearity, low creep, low temperature effect, and low hysteresis error with consistent repeatability, which may improve the accuracy of the reading from the weight sensor 112. A strain gauge may also include a robust configuration that may allow the weight sensor 112 to accommodate the total weight of the dishwasher, water within the dishwasher, the weight of the dishes, utensils, and other household objects, and a resilience factor/margin above the total weight.

The status indicator 100 may also include at least one temperature sensor 114 configured to sense a change of temperature of the washing compartment 16 from a position exterior of the washing compartment 16 such as through communication with the exterior door surface 22 of a dishwasher 10 or within the washing compartment 16 itself as discussed in an example below. Sensor 114 does not necessarily have to be in contact with the dishwasher 10 so long as the sensor can determine an appropriate change in temperature within washing compartment 16 so that the occurrence of an appropriate device cleaning cycle may be determined. Thus, it can be positioned away from, but adjacent to the device.

In some cases the status indicator 100 may also incorporate a sound sensor 121 that is keyed to identifying when device 10 is active or inactive at the beginning or end of one or more cycles. The sensors may transmit their respective data either through a wired connection or wirelessly. In an exemplary arrangement, the at least one weight sensor 112 transmits weight data wirelessly to the controller 102, the at least one temperature sensor 114 transmits temperature data to the controller 102 through a wired connection and if utilized the sound sensor 121 transmits a triggering of a specific device operational sound through a wired connection. The weight sensors may comprise either active or passive sensors. In an exemplary arrangement, one or more of the sensors may comprise a passive sensor such as a radio frequency identification device ("RFID") sensor so that it can be positioned remotely without the need for an additional power supply.

The status logic 104 within the controller 102 may be configured to receive the data from each of the sensors. The status logic 104 is configured to utilize this data to determine a clean/dirty status 116. The status logic 104 may also be configured to account for various situations which may occur as a user loads or empties the device 10 including, but not limited to: the speed of opening and closing the door 18; position effects of the door 18 on weight if not fully opened or closed; repetitive opening and closing of the door 18 during removal of dishes and/or silverware or during loading of one or more dishes and/or silverware into the dishwasher; the speed of the racks 24 when extended or retracted and effects of the racks if not fully extended or retracted; the removal of the racks 24 and/or a silverware basket (not shown); the accidental addition of dirty dishes and/or silverware to clean dishes and/or silverware; the impact of various methods of removing the silverware; the speed of removing the dishes, utensils, glasses, etc. from the dishwasher 10; partial emptying of the racks; and the effect bouncing caused from loading and unloading the dishes, utensils, glasses, etc. from the dishwasher 10 has on the weight sensor 112. The status logic 104 may also be configured to calculate rates of temperature change during the washing cycle, rates of temperature change of the room in which the dishwasher resides, and time it takes to allow and restrict certain events that may occur during the loading, unloading, washing, and resting processes. Based on the above variables, the status logic 104 may account for variability of the program to maximize accuracy per individual installation. The status logic 104 may display the clean/dirty status 116 on a visual display 118. The visual display 118 may include any of a variety of lights, textual displays, graphical displays, or any variety of known status indicators. In one exemplary arrangement, the visual display 118 may include a red diode light and a green diode light. When the output from the status logic 104 indicates a clean status, the green light may illuminate and when the status logic 104 indicates a dirty status, the red light may illuminate. The controller 102 may also be in communication with a manual override 120 element allowing a user to manually set the clean/dirty status 116.

Figure 3:
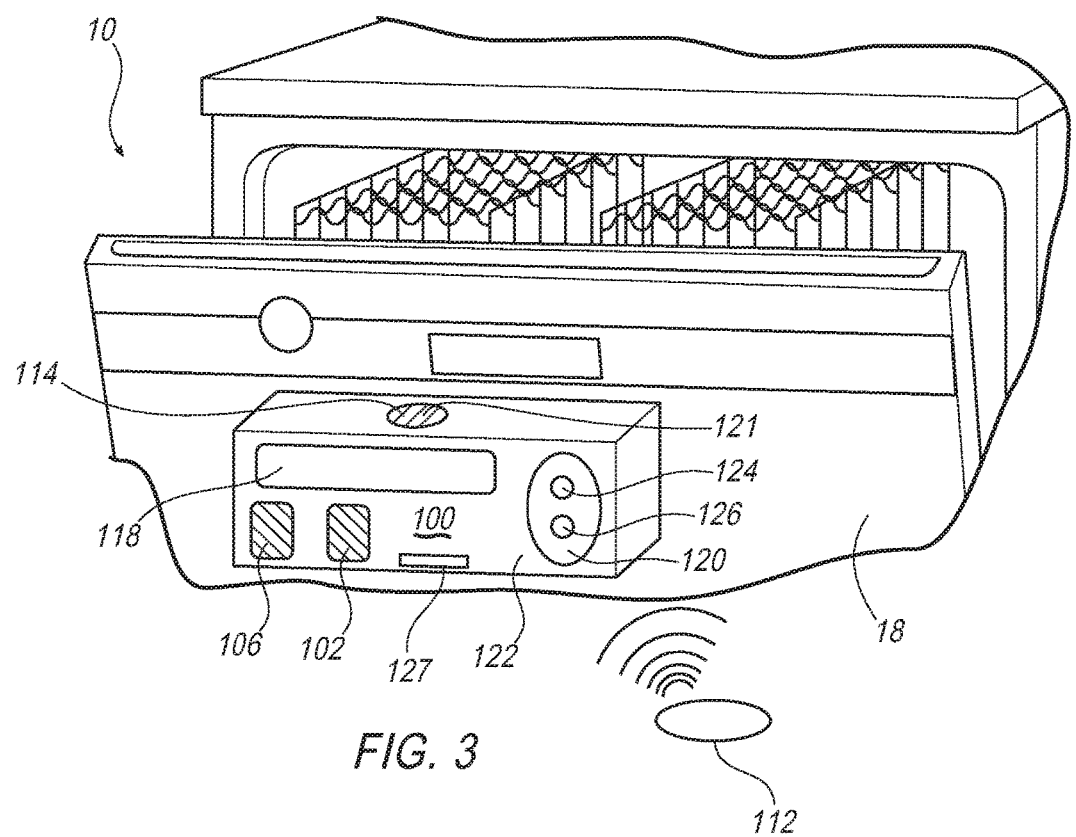
FIG. 3 is an exemplary illustration of a clean status indicator shown in FIG. 2 illustrated mounted on the exterior door surface of a dishwasher.

Referring now to FIG. 3, an exemplary illustration of one possible exemplary clean status indicator 100 is shown mounted on the exterior door surface 18 of a dishwasher 10. Status indicator does not have to be mounted to the device so long as it still may communicate with its associated sensors (e.g., it could be positioned on a kitchen countertop). In the case of new devices, the logic discussed above may be incorporated into the internal operational mechanism of the device with the possible exception of sensors such as a weight sensor 112 and sound sensor 121, which may not exist. With respect to a retrofit approach as illustrated, the status indicator 100 may include a housing 122 that is configured to be adjacent to the washing compartment 16. In the illustrated approach involving a retrofitting of an existing device the status indicator may be removably mounted to the exterior door surface 18. In one arrangement this may include a magnetic attachment. In other exemplary arrangements a removable adhesive attachment may be utilized. The removable mount nature of the housing 122 allows for the ease of aftermarket installation on existing dishwashers 10. The housing 122 houses the controller 102, the power supply 106 and the visual display 118. In one exemplary arrangement the housing 122 may further hold the at least one temperature sensor 114 such that the at least one temperature sensor contacts or is at least adjacent the exterior door surface 18 when the housing 122 is removably mounted so that it can measure an appropriate change in temperature. In other exemplary arrangements, the temperature sensor 114 may be mounted remotely from the housing 122 such as in close proximity to weight sensor 112 so long as a change of temperature within the device during operation may be determined. Ideally in the case of retrofitting, no penetration into the washing compartment 16 takes place although with new dishwashers, it is anticipated that information from a pre-existing sensor 114 may be used for the additional information gathering discussed herein. Similarly, a sound sensor 121 may be used when appropriate so long as it is able to identify when device 10 is active or inactive to signal completion or starting of one or more cleaning cycles. Sensor 121 may be within housing 122 or remote from it.

Nevertheless, in the disclosed exemplary retrofitting arrangement the weight sensor 112 is positioned remotely and communicates either through an associated wire or wirelessly with the controller 102. The manual override element 120 may be positioned on the housing 122 and include separate clean override 124 and dirty override 126 controls to allow a user to manually set the clean/dirty status 116 of the dishwasher's contents. In addition, a control surface 127 that can include button and inputs may be included to allow the user to input settings and/or to reset the device 10.

Figure 4:
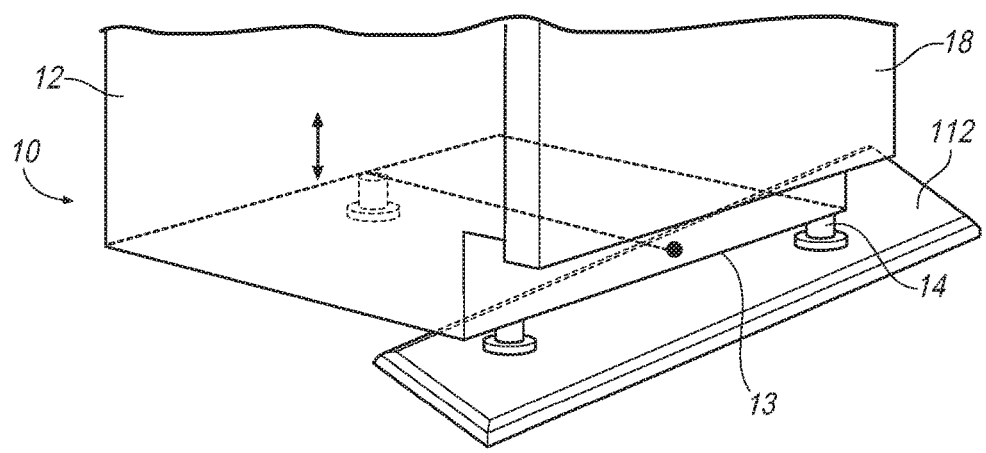
FIG. 4 is an exemplary illustration of a weight sensor for use in combination with the clean status indicator shown in FIG. 3.

Referring now to FIG. 4, which is an exemplary illustration of a removable weight sensor 112 for use with the controller 102 illustrated in FIG. 3. The weight sensor 112 may be positioned underneath one, more than one, or all of the supporting feet 14 of a dishwasher 10. As illustrated, the weight sensor 112, which may be a strain gauge, is disposed between a bottom surface of at least one supporting foot 14 of the device 10 and the ground. The use of a strain gauge as the weight sensor 112 may also allow the weight sensor 112 to be fit between the bottom surface of the at least one supporting foot 14 of the device 10 and the ground without restriction by surrounding structures such as the front metal toe plate, the immediately adjacent dishwasher frame 12, and/or cabinets. The compact thickness of the strain gauge may also allow for minimal to no vertical displacement of the dishwasher 10 during placement of the weight sensor 112 underneath the supporting foot 14.

Figure 5:
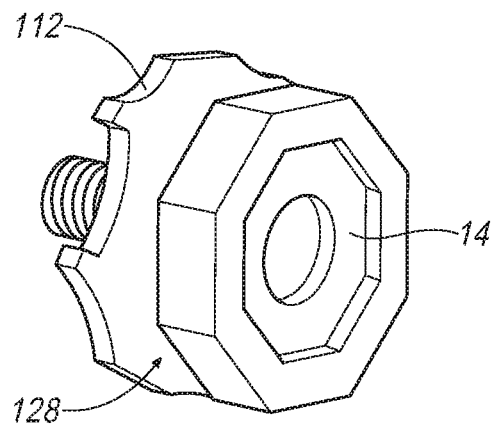
FIG. 5 is an exemplary illustration of an alternate weight sensor for use in combination with the clean status indicator shown in FIG. 3.
Figure 6:
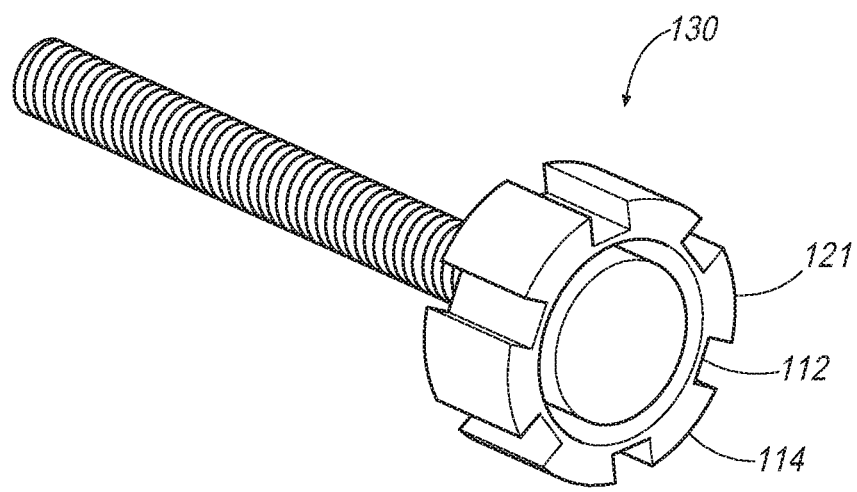
FIG. 6 is an exemplary illustration of an alternate weight sensor for use in combination with the clean status indicator shown in FIG. 3.

If two feet are used, it may more accurately reflect the change in weight. The weight sensor 112 may wirelessly communicate weight data to the controller 102 for use by the status logic 104. In one exemplary arrangement, the weight sensor 112 is a passive sensor such that it does not require its own power supply. Alternatively sensor 112 may be incorporated into the base 13 of the device. For example, supporting feet 14 may comprise a portion of base 13 and as illustrated in FIG. 5, the weight sensor 112 may comprise a sensor formed as an insert washer 128 mounted directly onto the supporting feet 14 of a dishwasher 10 as opposed to under the base and under the feet as illustrated in FIG. 4. In still another exemplary arrangement illustrated in FIG. 6, the weight sensor 112 may be incorporated into a replacement foot element 130 configured to replace one or more feet of a dishwasher 10 in the case of retrofitting. In yet another exemplary arrangement, the weight sensor 112 may be a strain gauge with an attached cup which may hold a foot 14 of the dishwasher 10.

Figure 7:
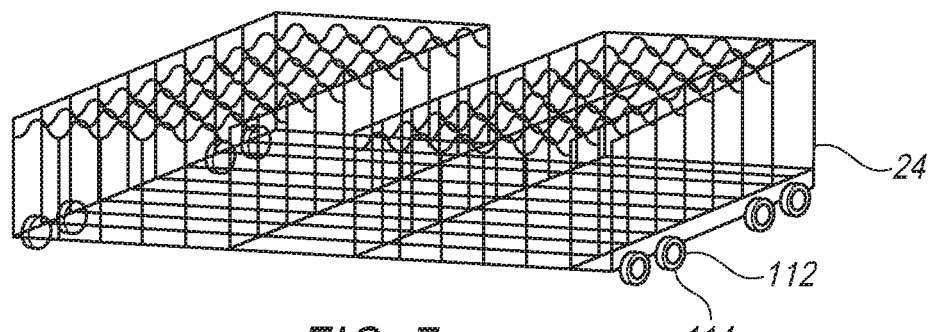
FIG. 7 is an exemplary illustration of an alternate weight sensor for use in combination with the clean status indicator shown in FIG. 3.

In still another exemplary arrangement as illustrated in FIG. 7, the weight sensor 112 may be incorporated into one or more of the movable racks 24 within the dishwasher. The racks 24 are configured to receive objects to be cleaned by the device and the weight sensor may adjust for the addition and subtraction of objects to the rack. Additionally or separately, if such a sensor 112 is utilized within the washing compartment 16, a temperature sensor 114 and/or a sound sensor 121 may also be used in the same location and as part of the same sensor unit, particularly if information is going to be transmitted wirelessly to controller 102 in the case of retrofitting to avoid physical penetration between the outer and inner portions of the device.

The dishwasher 10 may typically be in one of three states. In a first state, the operator may load or unload one or more dishes, glasses, silverware, etc. into or from the washing compartment 16 of the dishwasher 10. In the first state, the operator may open and close the door 18 of the dishwasher 10 and may retract/push in one or more racks 24. In the second state, the dishwasher 10 may be operating a clean cycle to clean the contents within the washing compartment 16. In a third state, the dishwasher 10 may be at rest. With the traditional rigid anchoring systems 500, movement of the dishwasher 10 is restricted such that the status indicator is unable to detect various events that may occur during the first state and the second state such as opening of the dishwasher 10 door, movement of the racks 24, or operating of the dishwasher 10. This may lead to inaccurate and/or inconsistent readings from the sensors, which may result in mixed readings, errors, or malfunction of the status indicator.

In the exemplary arrangement, the anchoring system may be configured to allow for minimal controlled fore/aft movement of the forward top portion 509 of the dishwasher 10 along a first axis 700, minimal lateral movement along a second axis 702 perpendicular to the first axis 700, and minimal superior/inferior movement along a third axis 704 perpendicular to both the first axis 704 and the second axis 702 (FIG. 1A). In one exemplary approach, the movement along the second axis 702 and the third axis 704 may be less than the movement allowed along the first axis 700. In another exemplary approach, the permitted movement along the first axis 700 may be the greatest followed by permitted movement along axis 704 and then the least movement being permitted along axis 702. It is generally envisioned, however, that at least minimal movement is allowed along all three axes (even though it may be desirable to permit more movement along a particular axis) so that the status indicator properly receives the necessary inputs to detect the various events noted above and as discussed in more detail below. The first axis 700 may coincide with the direction the door 18 of the dishwasher 10 opens/closes and the direction the racks 24 are pushed/pulled in. The second axis 702 may coincide with lateral movement of the dishwasher 10 resulting from uneven loading of dishes, silverware, glasses, etc. or movement of the dishwasher 10 during a cleaning cycle. The third axis 704 may coincide with the direction of the dishwasher 10 resulting from bouncing of one or more racks 24 during loading and unloading of the dishwasher 10 and/or movement during the cleaning cycle. The controlled movement of the dishwasher 10 in relation to the rigid support structure 501 may allow for linear shifting of the dishwasher 10 from the back feet/foot 14 to the front feet/foot 14 in a uniform and consistent manner during various events such as opening and closing of the dishwasher door 10, movement of the racks 24, and operation of the dishwasher 10. The exemplary anchoring system may also allow for minimal movement along the second axis 702 allowing the weight sensors 112 to detect a shift in the weight of the dishwasher 10 such as when the washing compartment 16 is unloaded unevenly or weight shifts during a cleaning cycle. Further, the exemplary anchoring system may also allow for minimal movement along the third axis 704 allowing the weight sensors 112 to detect bouncing of the racks 24 during loading/unloading and/or bouncing during a cleaning cycle. The three dimensional range of motion provided by the exemplary anchoring system may provide accuracy and consistency in the readings of the sensors and in particular the weight sensors 112 for optimal performance of the clean status indicator 100 while safely securing the dishwasher 10 in position. The exemplary mounting system may intentionally give additional play/movement along the first axis 700, and minimal movement along the second axis 702 and the third axis 704 through the use of at least one slot in at least one sliding component such as a bracket, which would not be obtainable with for example, merely a loose fastener in a hole of a mounting bracket known in the art. The exemplary mounting system may allow for at least $\frac{1}{8}^{th}$ of an inch and up to 1 inch of fore/aft movement while also allowing for minimal lateral and superior/inferior movement.

The exemplary mounting systems may include at least one first slide component 512 (composed of 514, 520, 518, 522, 516), 544, 804 and may include at least one second slide component 536, 540 558, 800. The first slide component 512, 544, 804 may include at least one slot 530, 532, 534, 546, 802, having a length extending along the first axis 700. The second slide component 536, 540, 558, 800 may be disposed within the slot 530, 532, 534, 546, 802 such that the first slide component 512, 544, 804 and the second slide component 536, 540, 558, 800 are moveable in relation to each other. At least one of the at least one first slide component 512, 544, 804 and the at least one second slide component 536, 540, 558, 800 may be secured to at least one of the device 10 and the rigid support structure 501 immediately adjacent the device 10.

In one exemplary arrangement as illustrated in FIGS. 8A-8C and 9A-9B, the at least one first slide component and the at least one second slide component may comprise a moveable mounting bracket 510. The moveable mounting bracket 510 may be secured to a rigid support structure 501 such as a cabinet wall or counter having a lower surface 502 immediately adjacent to the top surface 506 of the dishwasher 10 or to a side surface of the dishwasher 10. The at least one first slide component of the moveable mounting bracket 510 may include a first plate 512 that may include a first leg 514, a second leg 516, a third leg 518 stepped between the first leg 514 and the second leg 516, a first lip 520 that extends between the first leg 514 and the third leg 518, and a second lip 522 that extends between the second leg 516 and the third leg 518 (FIG. 8A). The first lip 520 and the second lip 522 may each have a length less than the length of each of the first leg 514, the second leg 516, and the third leg 518. In the exemplary arrangement illustrated in FIG. 8A, the first lip 520 may extend from the first leg 514 to the third leg 518 at an approximately 90 degree angle and the second lip 522 may extend from the second leg 516 to the third leg 518 at an approximately 90 degree angle, however, the first lip 520 and the second lip 522 may extend at any angle that may provide a step between the third leg 518 and the first leg 514 and the second leg 516. In the exemplary arrangement, the first leg 514 may include at least one first opening 524 defined therein, and the second leg 516 may include at least one second opening 526 defined therein, configured to each accommodate a mechanical fastener (not shown) such as a bolt or a screw. The mechanical fastener may be used to attach the moveable mounting bracket 510 to the lower surface 502 of the rigid support structure 501. In the exemplary arrangement of FIGS. 8B and 9A-9B, the first opening 524 may be circular (FIG. 8B) or a slot (FIGS. 9A-9B) and positioned approximately central of the first leg 514, and the second opening 526 may be circular (FIG. 8B) or a slot (FIGS. 9A-9B) and positioned approximately central of the second leg 516, however, one or more openings 524, 526 of any configuration may be in any appropriate location on the first leg 514 and the second leg 516. In another variation, the first leg 514 and the second leg 516 may not have any openings 524, 526 and an adhesive and/or welding may be used to attach the first plate 512 to the rigid structure 501. The third leg 518 may include a first slot 530 defined therein approximately central of the third leg 518. The first slot 530 may be positioned in relation to the dishwasher 10 so that the length of the first slot 530 extends along the first axis 700.

The at least one second slide component of the moveable mounting bracket 510 may include a second plate 536, adjacent an upper surface 519 of the third leg 518 of the first plate 512 (FIG. 8A), and at least one pin 540. In another exemplary arrangement, the second plate 536 may be adjacent a lower surface 606 of the third leg 518 (FIG. 9B). The second plate 536 and the third leg 518 of the first plate 512 may be substantially equivalent in shape and size. The second plate 536 may include a first opening 538 defined therein approximately central of the second plate 536 configured to accommodate the at least one pin 540. In an alternate exemplary arrangement, the pin 540 may be secured directly to the second plate 536 in a number of variations including, but not limited to, welding and/or an adhesive. The pin 540 may be configured to accommodate a mechanical fastener such as a screw.

In another exemplary arrangement, the configuration of the third leg 518 and the second plate 536 may be reversed so that the second plate 536 may include the first slot 530 defined therein approximately central of the second plate 536.

In the exemplary arrangement, the pin 540 may extend within the first opening 538 and within the first slot 530. The outer periphery of the pin 540 and the outer periphery of the first slot 530 may be configured so that there is a slight gap or clearance between the outer periphery of the pin 540 and the inner periphery of the first slot 530 to reduce friction that may occur during movement of the pin 540 within the first slot 530 along the first axis 700 and may also allow for a degree of movement along the second axis 702 and the third axis 704, with the degree of movement along the first axis 700 being greater than the degree of movement along the second axis 702 and the third axis 704.

The pin 540 may be secured to an existing top bracket 504 (FIG. 1A) on the top surface 506 of the dishwasher 10 or to a side bracket attached to a side surface of the dishwasher 10 (not illustrated) via a mechanical fastener to allow for the subtle rocking of the dishwasher 10.

In one exemplary arrangement, the third leg 518 may also include a second slot 532 and a third slot 534 positioned on opposing sides of the first slot 530 and defined within the third leg 518 (FIG. 8B). The second slot 532 and the third slot 534 may have the same width and length, and may be greater in length than the first slot 530 or may be of various widths and lengths. The second plate 536 may include at least two second openings 542 defined therein offset from the first opening 538 configured to accommodate at least one mechanical fastener 528 (FIG. 8C), such as a bolt or screw. A first and second mechanical fastener 528 may extend through the second openings 542 and through the second slot 532 and the third slot 534, respectively, to moveably secure the second plate 536 to the first plate 512. In another exemplary arrangement, the configuration of the third leg 518 and the second plate 536 may be reversed so that the second plate 536 may include the second slot 532 and the third slot 534. The outer periphery of the mechanical fasteners 528 and the inner periphery of the second and third slots 532, 534 may also be configured so that there is a slight gap or clearance between the outer periphery of the second and third slots 532, 534 that may reduce friction between the mechanical fasteners 528 and the second and third slots 532, 534 along the first axis 700. The gap between the mechanical fasteners 528 and the slots 532, 534 may also provide a degree of give along the second axis 702 and the third axis 704. The use of the second slot 532 and the third slot 534 may further ensure the controlled substantially linear movement of the dishwasher 10 along the first axis 700 while restricting lateral movement along the second axis 702. While the use of two additional slots 532, 534 are illustrated, it is noted that any number of additional slots may be used to ensure the linear movement of the dishwasher 10.

In another exemplary arrangement illustrated in FIGS. 9A-9B, the second plate 536 may be adjacent a lower surface 606 of the third leg 518 so that the additional slots 532, 534 may be removed and the first lip 520 and the second lip 522 may ensure the linear movement along the first axis 700 as well as a degree of give along the second axis 702, and third axis 704.

Figure 10A:
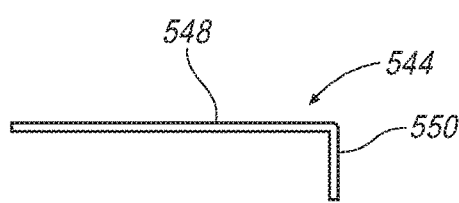
FIG. 10A is an exemplary illustration of a side view of another mounting bracket for use in combination with the sample device shown in FIG. 1A.
Figure 11A:
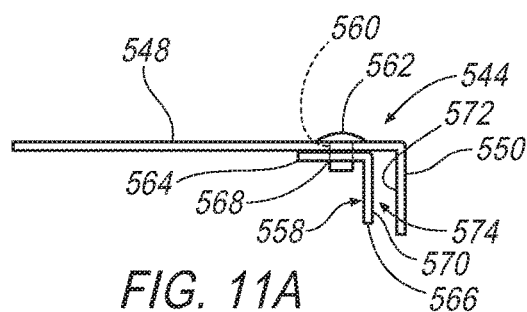
FIG. 11A is an exemplary illustration of a side view of another mounting bracket for use in combination with the sample device shown in FIG. 1A.
Figure 10B:
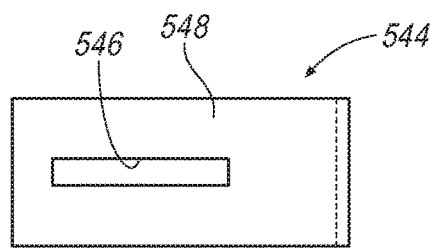
FIG. 10B is an exemplary illustration of a top view of the mounting bracket illustrated in FIG. 10A.
Figure 11B:
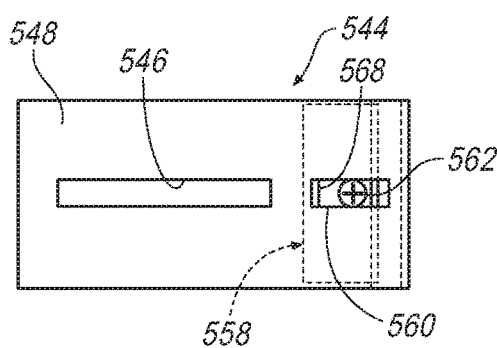
FIG. 11B is an exemplary illustration of a top view of the mounting bracket illustrated in FIG. 11A.
Figure 12:
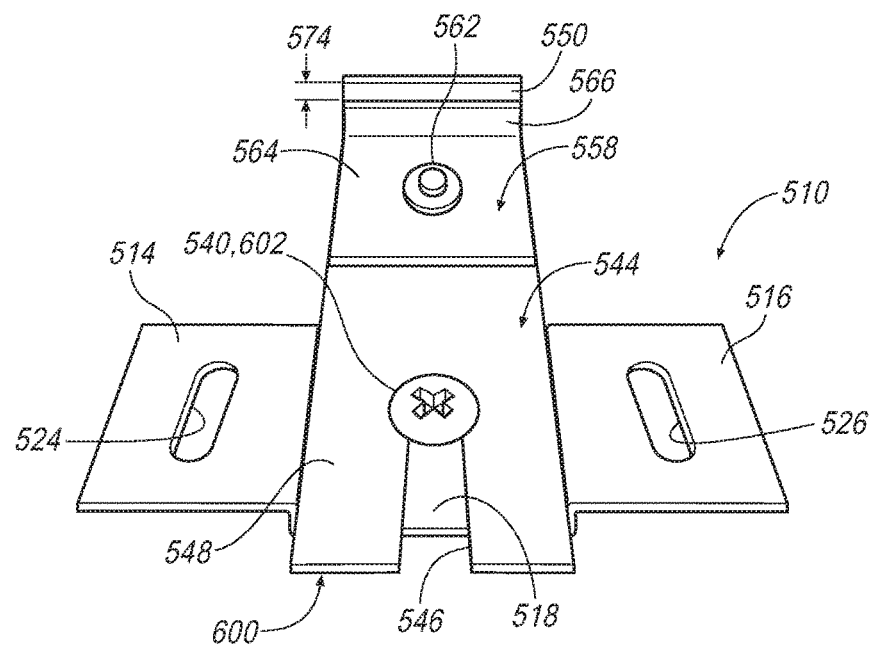
FIG. 12 is an exemplary illustration of a bottom view of another mounting bracket for use in combination with the sample device shown in FIG. 1A.

In another exemplary arrangement as illustrated in FIGS. 10A-10B, the first slide component may include at least one "L" shaped mounting bracket 544 including an adjustment slot 546 defined therein and the second slide component may comprise a mechanical fastener (not illustrated) such as a bolt or a screw. The length of the adjustment slot 546 may be positioned along the first axis 700. The "L" shaped mounting bracket 544 may include a first leg 548 and a second leg 550 substantially perpendicular to the first leg 548. The second leg 550 may include a length significantly shorter than the length of the first leg 548. The adjustment slot 546 may be defined within the first leg 548 so that the adjustment slot 546 is surrounded by the first leg 548. In another variation, the adjustment slot 546 may extend through an end 600 of the first leg 548 (FIG. 12). The adjustment slot 546 may allow for attachment of the "L" shaped mounting bracket 544 to a variety of dishwasher 10 configurations as the adjustment slot 546 allows for the attachment of the "L" shaped bracket 544 to the rigid support structure 501 and/or surface of the dishwasher 10 in various positions. In a first exemplary arrangement, the "L" shaped mounting bracket 544 may be rigidly secured to the rigid support structure 501 via at least one mechanical fastener, such as a bolt or screw. The "L" shaped mounting bracket 544 may also be secured to the top surface 506 of the dishwasher 10 such as between a gap 552 (FIG. 1A) defined between an upper forward flange 554 of the frame 12 of the dishwasher 10 and an intermediate flange 556 of the dishwasher 10 behind the upper-forward flange 554 or a gap defined on a side surface of the dishwasher 10 (not illustrated). The "L" shape of the mounting bracket 544 may allow the second leg 550 to move along the first axis 700, the second axis 702, and the third axis 704 within the gap 552 allowing for the dishwasher 10 to move three-dimensionally in relation to the rigid support structure 501.

In another exemplary arrangement, the "L" shaped mounting bracket 544 may be rigidly attached to the dishwasher 10 such as onto or between an upper forward flange 554 of the frame 12 of the dishwasher 10, onto or between a side flange and/or gap defined within a side surface of the dishwasher 10 (not illustrated), and/or one or more boxes or blocks (not illustrated). The mechanical fastener (not shown) may extend through the slot 546 and may be used to attach the "L" shaped mounting bracket 544 to the lower surface 502 of the rigid support structure 501. The outer periphery of the mechanical fastener and the inner periphery of the adjustment slot 546 may be configured so that there is a gap or clearance between the mechanical fastener and the adjustment slot 546 to reduce friction that may occur between the mechanical fastener and the adjustment slot 546 and may allow for a degree of movement of the slot 546 in relation to the mechanical fastener along the first axis 700, the second axis 702, and the third axis 704, with the degree of movement being greatest along the first axis 700.

In another exemplary arrangement, the "L" shaped mounting bracket 544 may be adjustably secured to both the rigid support structure 501 and a top surface 506 or side surface of the dishwasher 10. A mechanical fastener (not shown), such as a bolt or screw, may extend through the slot 546 and may be used to attach the "L" shaped mounting bracket 544 to the lower surface 502 of the rigid support structure 501. The outer periphery of the mechanical fastener and the inner periphery of the adjustment slot 546 may be configured so that there is a gap or clearance between the mechanical fastener and the adjustment slot 546 to reduce friction that may occur between the mechanical fastener and the adjustment slot 546 along the first axis 700. The gap or clearance may also provide a degree of give along the second axis 702 and the third axis 704. The "L" shaped mounting bracket 544 may also be secured to the top surface 506 of the dishwasher 10 such as between a gap 552 (FIG. 1A) defined between an upper forward flange 554 of the frame 12 of the dishwasher 10 and an intermediate flange 556 of the dishwasher 10 behind the upper-forward flange 554 or attached to either of those flanges or any upper flange and/or a flange or gap on a side surface of the dishwasher 10 (not illustrated). The "L" shape of the mounting bracket 544 may allow the second leg 550 to move along the first axis 700, the second axis 702, and the third axis 704 within the gap 552. The adjustable slot 546 and the "L" shape of the mounting bracket 544 may allow for the dishwasher 10 to move three-dimensionally in relation to the rigid support structure 501.

In another exemplary arrangement, the first leg 548 of the first "L" shaped mounting bracket 544 may be secured to the at least one pin 540 of the moveable mounting bracket 510 as discussed above and illustrated in FIGS. 8A-8C and 9A-9B via a mechanical fastener, such as a screw, instead of directly to the rigid support structure 501.

Figure 13:
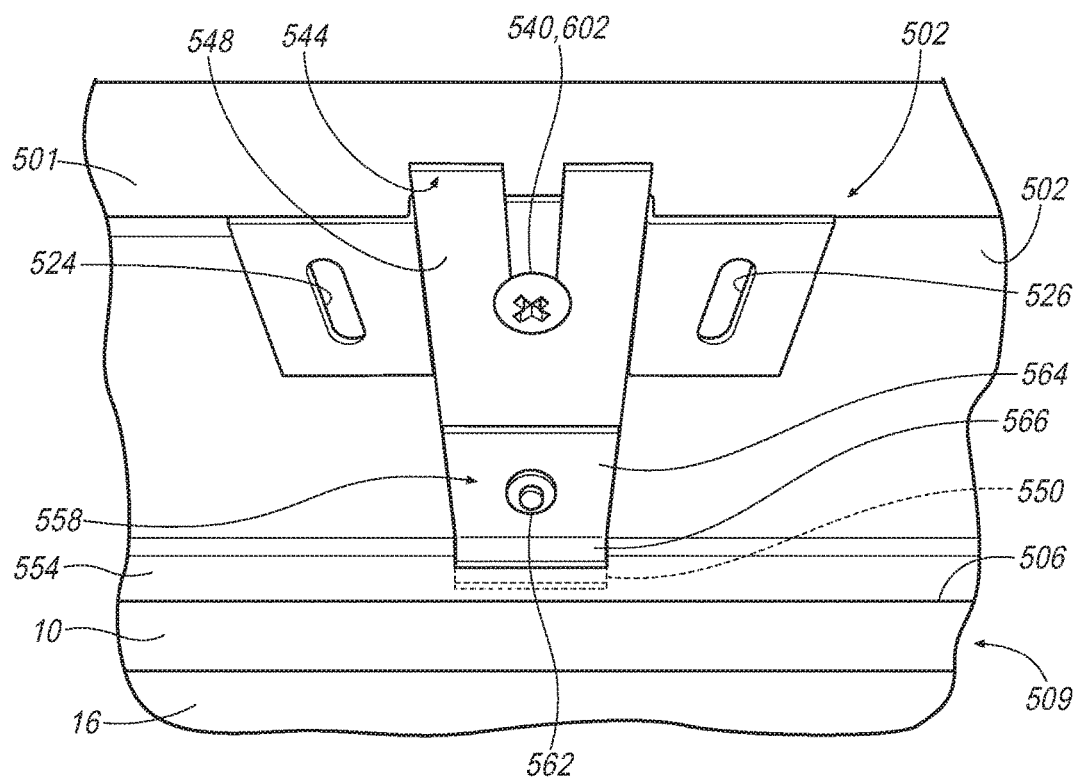
FIG. 13 is an exemplary illustration of the mounting bracket of FIG. 12 used in combination with the sample device shown in FIG. 1A.

In yet another exemplary arrangement as illustrated in FIGS. 11A-11B, 12, and 13, the at least one first slide component may comprise the first "L" shaped mounting bracket 544, as described above and illustrated in FIGS. 10A-10B, and a second "L" shaped mounting bracket 558 adjustably secured to the first "L" shaped mounting bracket 544 and the second slide component may comprise a mechanical fastener 602 (FIGS. 12 and 13), such as a bolt or a screw. The first leg 548 of the first "L" shaped mounting bracket 544 may further include an opening or slot 560 defined therein configured to accommodate a mechanical fastener 562, such as a bolt or screw, and to allow adjustment of the position of the second "L" shaped mounting bracket 558 in relation to the first "L" shaped mounting bracket 544. The second "L" shaped mounting bracket 558 may include a first leg 564 and a second leg 566 that may extend substantially perpendicular to the first leg 564. The second leg 566 may include a length slightly less than the length of the second leg 550 of the first "L" shape mounting bracket 544. The first leg 564 of the second "L" shaped mounting bracket 558 may further include an opening 568 defined therein configured to accommodate a mechanical fastener 562. The second "L" shaped mounting bracket 558 may be positioned so that an outer surface 570 of the second "L" shaped mounting bracket 558 faces an inner surface 572 of the first "L" shaped mounting bracket 544. A mechanical fastener 562 may extend through the openings 560, 568 in the first "L" shaped mounting bracket 544 and the second "L" shaped mounting bracket 558 to adjustably secure the first "L" shaped mounting bracket 544 and the second "L" shaped mounting bracket 558 together. The first "L" shaped mounting bracket 544 and the second "L" shaped mounting bracket 558 may be configured so that when they are secured together, an inner surface 572 of the second leg 550 of the first "L" shaped mounting bracket 544 and an outer surface 570 of the second leg 566 of the second "L" shaped mounting bracket 558 define a gap 574. The gap 574 between the first "L" shaped mounting bracket 544 and the second "L" shaped mounting bracket 558 may allow the first "L" shaped mounting bracket 544 and the second "L" shaped mounting bracket 558 to fit onto a top surface 506 of the dishwasher 10, such as the upper-forward flange 554 of the frame 12 of the dishwasher 10 or a flange and/or gap defined within a side surface of the device 10 (not illustrated), to secure the "L" shaped mounting bracket 558 to the dishwasher 10. A mechanical fastener 602 may extend through the adjustment slot 546 in the first "L" shaped mounting bracket 544 to secure the first "L" shaped mounting bracket 544 to the lower surface 502 of rigid support structure 501 (FIG. 13). The outer periphery of the mechanical fastener 602 and the inner periphery of the adjustment slot 546 may be configured so that there is a gap or clearance between the mechanical fastener 602 and the adjustment slot 546 to reduce friction that may occur between the mechanical fastener 602 and the adjustment slot 546 along the first axis 700. The gap or clearance may also provide a degree of give along the second axis 702 and third axis 704.

In another exemplary arrangement, the first "L" shaped mounting bracket 544 may be alternately secured to the pin 540 of the moveable mounting bracket 510 as discussed above and illustrated in FIGS. 8A-8C and 9A-9B via the mechanical fastener 602, as illustrated in FIG. 13.

Figure 14A:
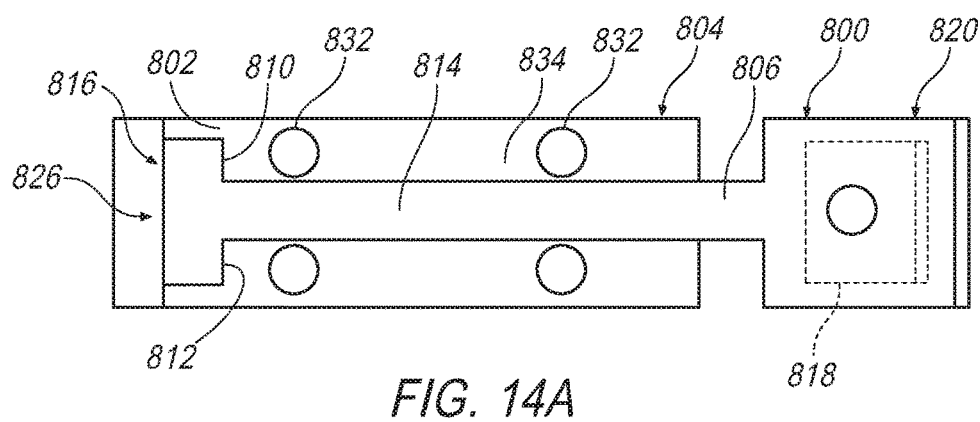
FIG. 14A is an exemplary illustration of a top section view of another mounting bracket for use in combination with the sample device shown in FIG. 1A.
Figure 14B:
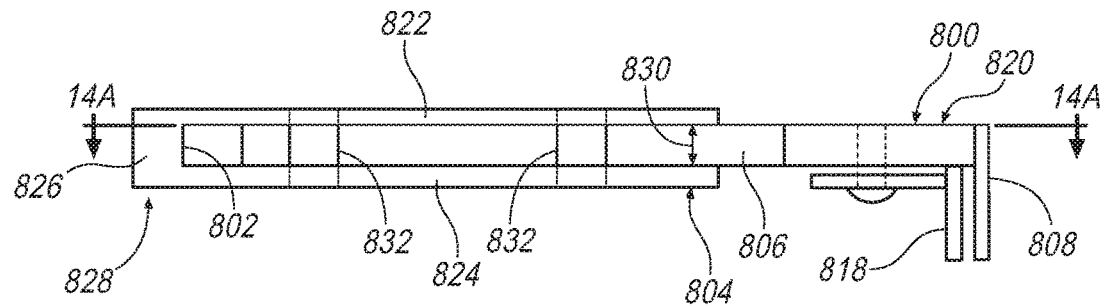
FIG. 14B is a side view of the mounting bracket illustrated in FIG. 14A.

In yet another exemplary arrangement, as illustrated in FIGS. 14A-14B, the at least one first slide component may comprise a bracket 804 and the at least one second slide component may comprise an "L" shaped bracket 800. The "L" shaped bracket 800 may act as the sliding component, which moves within a slot 802 defined within the bracket 804. The "L" shaped bracket 800 may include a first leg 806 and a second leg 808 substantially perpendicular to the first leg 806 at a free end of the first leg. The second leg 808 may include a length significantly shorter than the length of the first leg 806. The first leg 806 may include a first cutout 810 and a second cutout 812 opposite of the first cutout 810 so that a middle section 814 of the first leg 806 includes a width less than a width of an end portion 816, 820 of the first leg 806. A second "L" shaped bracket 818 may be adjustably secured to a first end 820 of the first leg 806 as similarly discussed above and illustrated in the exemplary arrangement of FIGS. 11A and 11B. The bracket 804 may define a slot or channel 802, which may accommodate a portion of the first "L" shaped bracket 800. In the exemplary arrangement illustrated in FIG. 14B, the bracket 804 may include a top wall 822, a bottom wall 824 opposite of the top wall 822, and a side wall 826 at a first end 828 of the top wall 822 and the bottom wall 824. A gap 830 may be defined between the top wall 822 and the bottom wall 824 and may accommodate a portion of the first "L" shaped bracket 800. At least one support structures 832, such as rods, pins, bolts, or screws, may extend between the top wall 822 and the bottom wall 824 and may further define a slot or channel 834 for the middle section 814 of the "L" shaped bracket 800 to move within. The side wall 826 of the bracket 804 may act as a stop for the second end 816 of the first "L" shaped bracket 800 along the first axis 700. The first "L" shaped bracket 800 and the second "L" shaped bracket 818 may be rigidly secured to a top surface 506 of the dishwasher 10 and the bracket 804 may be rigidly secured to a lower surface 502 of the rigid support structure 501 so that the slot 802 is positioned along the first axis 700. The outer periphery of the middle section 814 of the first "L" shaped bracket 800 and the channel 834 defined by the support structures 832 may be configured so that there is a gap or clearance between the middle section 814 of the "L" shaped bracket 800 and the channel 834 to reduce friction that may occur as the first "L" shaped bracket 800 moves within the channel 834. The channel 834 may allow for movement of the first "L" shaped bracket 800 along the first axis 700 and also may provide a minimal degree of give along the second axis 702 and the third axis 704. The above exemplary arrangement is for illustrative purposes only, and it is noted that any number of configurations of brackets may be used that allow for the piston type movement of the brackets without departing from the spirit and scope of the invention.

The above anchoring systems may be incorporated into new dishwashers or pre-existing anchoring systems. The above configurations of the various anchoring systems alone or in combination allow for three-dimensional movement of a variety of dishwasher designs using a clean sensor indicating system. It is noted that the above anchoring systems are discussed for illustrative purposes only and any number of anchoring system configurations having a slot may be used to provide movement of the dishwasher 10 along the first axis 700, and minimal movement along the second axis 702 and the third axis 704.

Figure 15:
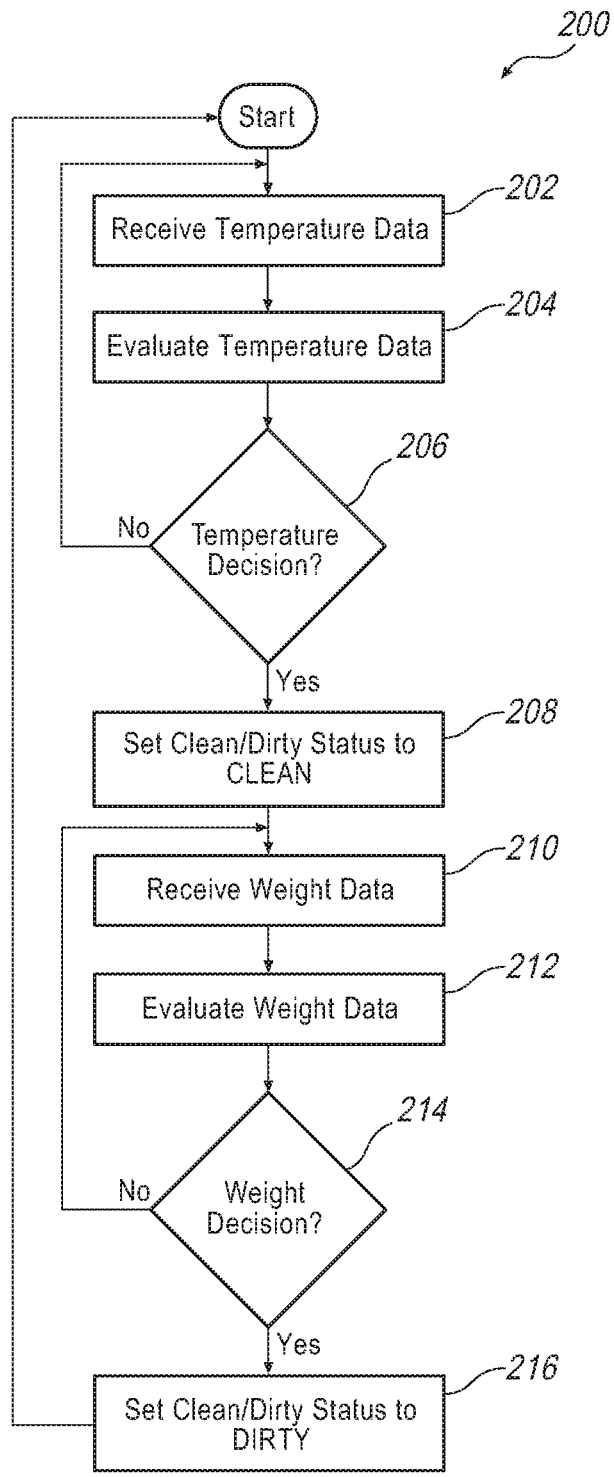
FIG. 15 is an exemplary chart of the status logic process for use in the clean status indicator.

FIG. 15 is an exemplary chart of the status logic 104 for use in the clean status indicator 100. The process 200 includes receiving temperature data 202 from the at least one temperature sensor 114. The data is evaluated to determine a dishwasher operating event 204. A temperature decision 206 is made by determining if a change of temperature is greater than a predetermined threshold and if the operating event is not found the process is restarted. If the operating event is found, the clean/dirty status is set to clean 208. In practice, the change in temperature is expected to be greater than an expected change in ambient temperature. While in many situations the temperature may increase since hot water aids in cleaning, in other cases the temperature may go down as with the use of cold water in an energy saving mode. The process 200 then receives weight data from the at least one weight sensor 210. The data is evaluated to determine if the dishwasher has been emptied 212. A weight decision 214 is made by comparing the weights to determine if a threshold has been met. If the dishwasher has not been emptied the process 200 continues to monitor weight 210. If the dishwasher has been emptied the clean/dirty status is set to dirty 216 and the process 200 is restarted. The temperature data evaluation 204 and the weight data evaluation 212 may comprise simple delta changes in values or may implement more complex calculations. Additionally, calibrations are anticipated such that a first base weight provided to controller 102 may be an empty weight of the device while a second base weight provided to the controller 102 before a change of temperature may be the full weight of the device with objects to be cleaned. Similarly, an initial temperature may be an ambient temperature.

Figure 16:
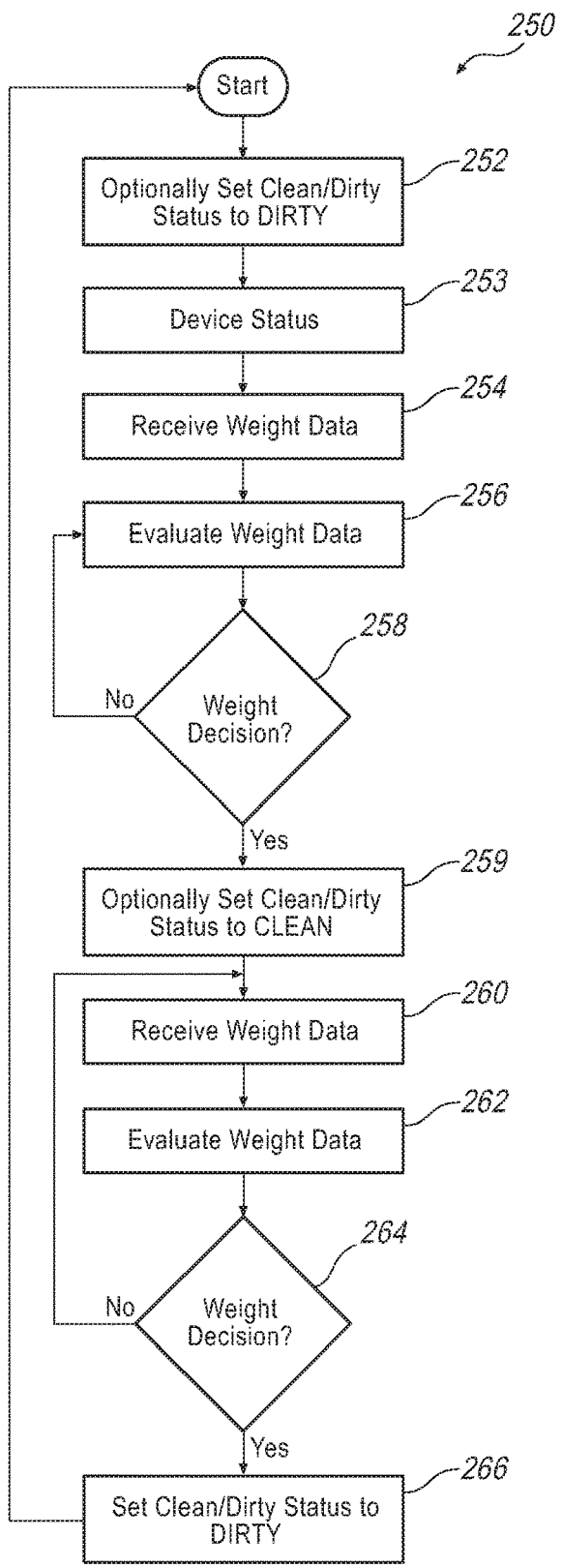
FIG. 16 is another exemplary chart of the status logic process for use in the clean status indicator.

In some situations an additional weight decision may be used in place of or as a supplement to temperature decision 206 as part of status logic 104 as illustrated in FIG. 15. In the illustration that follows it is assumed that weight sensor 112 is able to compare the weight of the entire device during operation as opposed to being associated with movable racks 24 as illustrated in FIG. 7. For example, as shown by way of exemplary process 250 in FIG. 16, the controller is told that the dishes are "dirty" 252. This determination may be done manually using manual override 120 or automatically by way of step 266 as discussed below.

An initial base weight is evaluated as shown by weight data evaluation 254 before the device cycles commence, but after the device is "full". Potentially, weight is recorded after a mechanical noise such as the starting of a device motor is recorded 253 by way of an additional sensor, sound sensor 121 right at the beginning of a first operational cycle for cleaning objects contained within the washing compartment 16. In the case of a device having a device status indicator 100 integrated when originally constructed or in the case of some retrofitting approaches, the base weight may be measured when one hits the "start" button and no sound sensor 121 may be necessary. Water is added to washing compartment 16 as part of at least one cleaning cycle and removed. The change of weight is received at block 256 wherein the weight of the added water is greater than the initial base weight. The fact that the weight changed beyond a first object weight threshold that reflects an increase of weight from the base weight when water is added may be recorded as shown at decision point 258 and an identification that the device has been subjected to one or more cycles captured by the controller 102. The visual display 118 may be updated at 259 by controller 102 for changing the status from "Dirty" to "Clean" Then the process continues as with FIG. 16 such that it captures when the weight of items within the washing compartment 16 fall below a threshold level representing a second object weight threshold as shown by receiving weight data at block 260, evaluating the weight data as shown at block 262, and then determining if the drop in weight from the initial base weight is greater than a threshold level as shown at decision point 264. If the device has been emptied the clean/dirty status is set to "Dirty" 266 by way of controller 102 and the process 250 is restarted. In this approach the increase in weight of the device based on an initial base weight identifies that a cycle has commenced and the decrease in weight of the device based on the initial base weight identifies that the device has been emptied of the cleaned objects and is ready to be filled again for cleaning.

Figure 17:
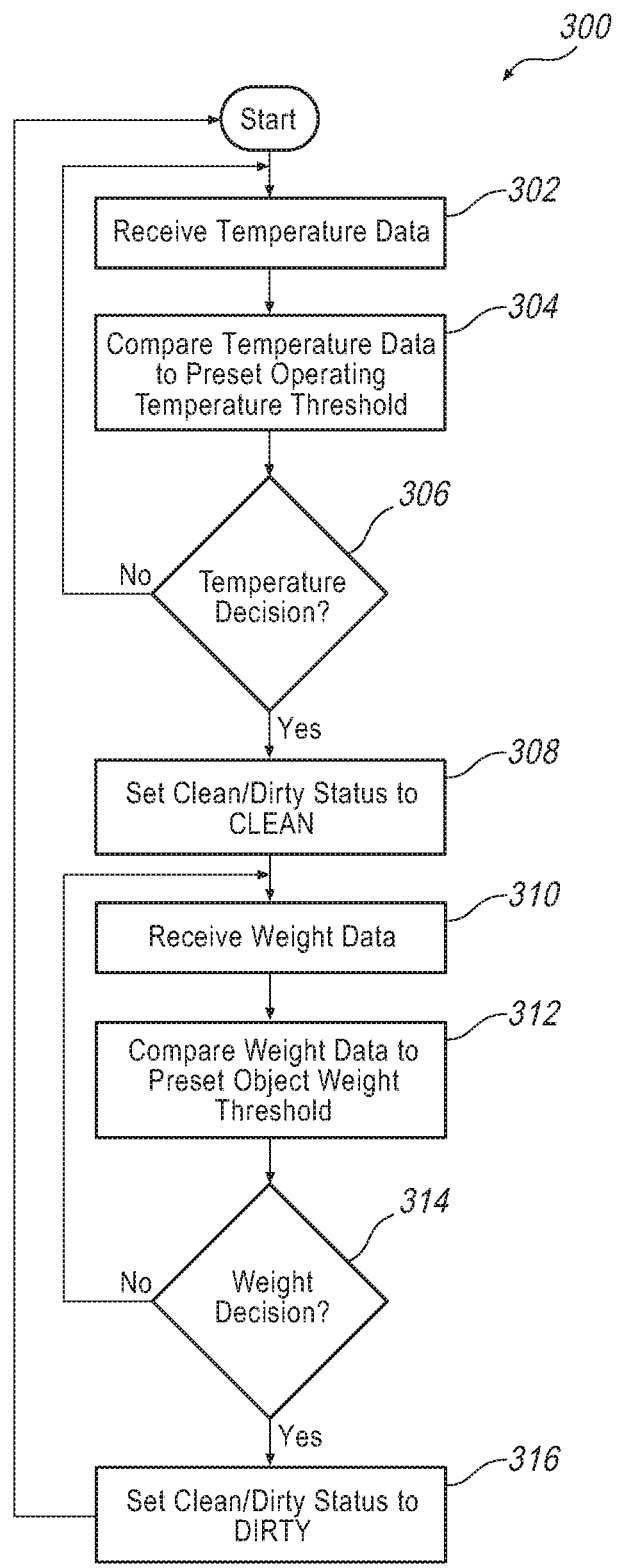
FIG. 17 is another exemplary chart of the status logic process for use in the clean status indicator.

Referring now to FIG. 17, which is another exemplary chart of the status logic 104 for use in the device status indicator 100. The process 300 includes receiving temperature data from the at least one temperature sensor 302. The data is compared to a preset operating temperature threshold to determine a device operating event 304. In one exemplary arrangement the preset operating temperature threshold is set by the manufacturer. In another exemplary arrangement the preset operating temperature threshold is owner defined. This may be accomplished through the control surface 127. The owner may manually enter a value, or may simply hold down a portion of the control surface 127 while the device is operating to set the preset operating temperature threshold. A temperature decision 306 is made and if the preset operating temperature threshold has not been exceeded the process is restarted. If the preset operating temperature threshold has been exceeded, the clean/dirty status is set to clean 308. The process 300 then receives weight data from the at least one weight sensor 310. The data is compared to a preset object weight threshold to determine if the device has been emptied 312. A weight decision 314 is made and if the weight data is not below the preset object weight threshold the process 300 continues to monitor weight 310. If the weight data is less than the preset object weight threshold the clean/dirty status is set to dirty 316 and the process 300 is restarted. In one exemplary arrangement the preset object weight threshold is set by the manufacturer. In another exemplary arrangement the preset object weight threshold is owner defined. The owner may manually enter a value, or may simply hold down a portion of the control surface 127 while the device is either empty or full of a desired minimum number of objects. This allows a user to accommodate a minimum number of dishes that may not have been adequately cleaned while still allowing the process 300 to set the clean/dirty status to dirty 316. Additionally, it further allows the user to partially unload the device and still have the process 300 maintain the clean/dirty status as clean 308 as long as the weight data remains above the preset object weight threshold.

Figure 18:
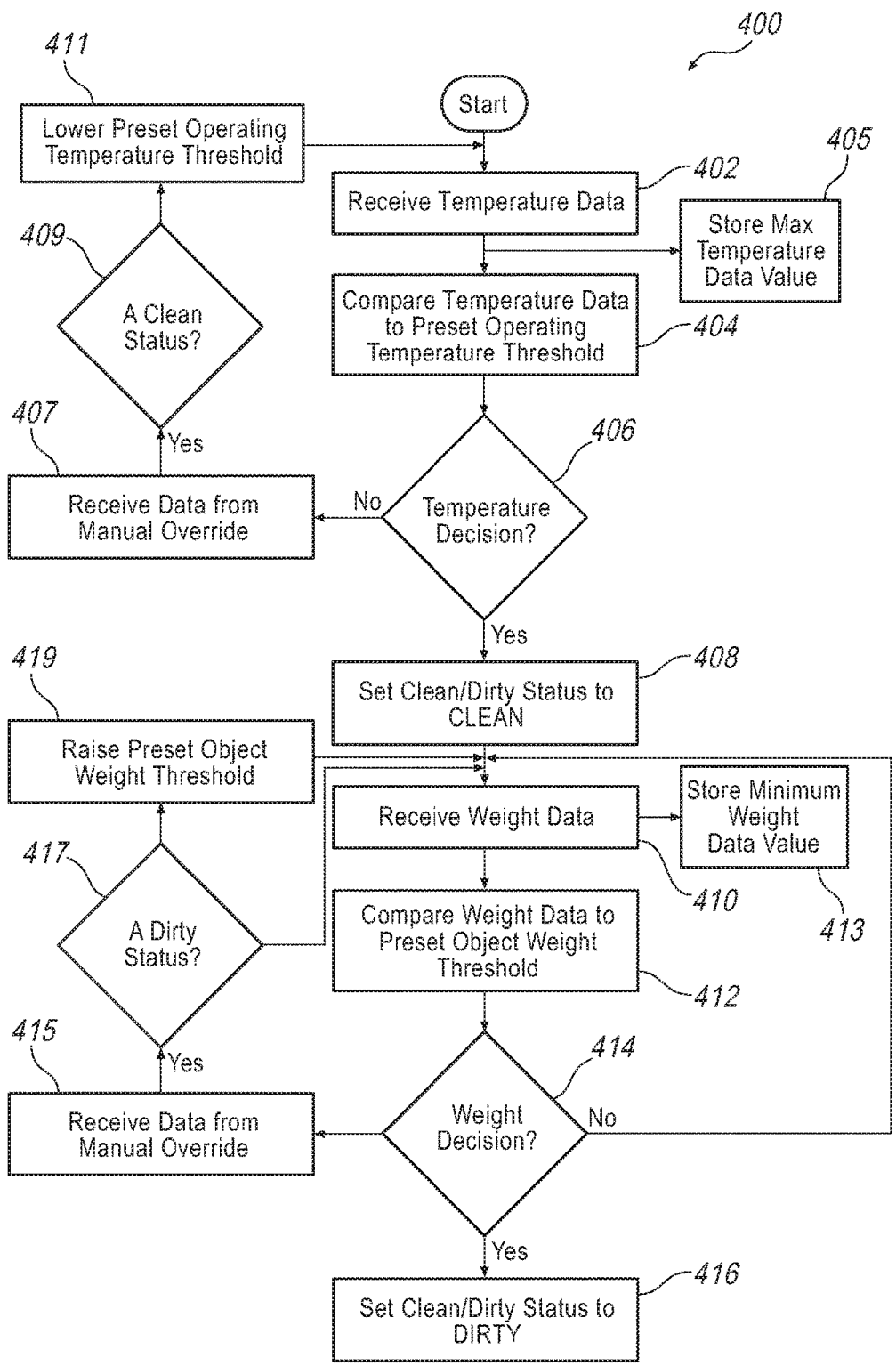
FIG. 18 is another exemplary chart of the status logic process for use in the clean status indicator.

Referring now to FIG. 18, which is another exemplary chart of the status logic 104 for use in the device status indicator 100. The process 400 includes receiving temperature data from the at least one temperature sensor 402. The data is compared to a preset operating temperature threshold to determine a device operating event 404. A maximum temperature may be stored during this process 405. The preset operating temperature may be set by the manufacturer or by the user as previously described. A temperature decision 406 is made and if the preset operating temperature threshold has not been exceeded the process 400 receives data from the manual override 407. The process 400 determines if a manual override indicates a clean status 409. If the manual override indicates that the user has assigned a clean status even though the preset operating temperature threshold has not been exceeded the preset operating temperature 411 is lowered and the process is restarted. In one exemplary arrangement the preset operating temperature may be incrementally decreased. In this example, the status indicator 100 will slowly adapt to the individual characteristics of the users particular device. In another exemplary arrangement, the preset operating temperature may be decreased to the maximum temperature stored 405. In this example, the user need only make a single manual override after installation to set the status indicator 100 to match the user's particular device.

If the preset operating temperature threshold has been exceeded, the clean/dirty status is set to clean 408. The process 400 then receives weight data from the at least one weight sensor 410. The data is compared to a preset object weight threshold to determine if the device has been emptied 412. A minimum weight may be stored 413 during this process. A weight decision 414 is made and if the weight data is not below the preset object weight threshold the process 400 receives data from the manual override 415. The process 400 determines if a manual override indicates a dirty status 417. If the manual override indicates that the user has assigned a dirty status even though the preset object weight threshold has been exceeded the preset object weight threshold 419 is raised and the process is restarted. In one exemplary arrangement the preset operating temperature may be incrementally increased. In this example, the status indicator 100 will slowly adapt to the individual characteristics of the users particular device as well as the characteristics of the user. If a user occasionally leaves one or two dishes or several pieces or silverware, the status indicator 100 will adapt to still set the status to dirty. In another exemplary arrangement, the preset object weight threshold may be set to the stored minimum weight. In this example, a user need only make a single manual override after installation to set the status indicator to match the user's particular device or tailor it to their habits.

Accordingly, it is to be understood that the above description is intended to be illustrative and not restrictive. Many embodiments and applications other than the examples provided would be apparent upon reading the above description. For example, sound sensor 121 may be used in other approaches other than that discussed for FIG. 16 to provide an additional indication that at least one cleaning cycle has commenced and to permit the calibration of weights and temperatures from sensors 112 and 114 that are then compared with thresholds. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

It should be understood that the controller 102 and the status logic 104 may include computer-executable instructions such as the instructions of the software applications on a processor, where the instructions may be executable by one or more computing devices. In general, a processor (e.g., a microprocessor) receives instructions (e.g., from a memory), a non-transitory computer-readable medium, etc., and executes these instructions, thereby performing one or more processes, including one or more of the processes described herein. Such instructions and other data may be stored and transmitted using a variety of computer-readable media. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The controller 102 and the status logic 104 may take many different forms and include multiple and/or alternate components and facilities. Indeed, additional or alternative components and/or implementations may be used, and thus the above controller examples should not be construed as limiting.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A clean status indicator anchoring system for use with and on a dishwasher, the dishwasher including a frame with a base, and a washing compartment within the frame, the clean status indicator anchoring system comprising:

at least one weight sensor configured to removably mount to the dishwasher externally of the washing compartment of the dishwasher, the weight sensor configured to sense the weight of objects within the washing compartment;

at least one temperature sensor configured to monitor the temperature within the washing compartment;

a housing having a visual display configured to removably mount to a location external of the frame, the visual display is operable for conveying a clean/dirty status of objects within the washing compartment;

a controller positioned within the housing, the controller having a control logic and a status logic in operative communication with a power supply, the at least one weight sensor, the at least one temperature sensor, and the visual display, wherein the controller is operable for monitoring the clean/dirty status of objects within the washing using the at least one weight sensor and the at least one temperature sensor and sending data to the visual display;

at least one first slide component having at least one slot defined therein;

at least one second slide component disposed within the at least one slot configured to move in relation to the at least one first slide component along at least a first axis extending along a length of the at least one slot, a second axis extending along a width of the at least one slot, and a third axis extending perpendicular to the first axis and the second axis; and wherein at least one of the at least one first slide component and the at least one second slide component is configured to be secured to at least one of the dishwasher and a rigid support structure immediately adjacent to the dishwasher to allow for a controlled degree of movement of the dishwasher along at least the first axis, the second axis, and the third axis.

2. The clean status indicator anchoring system of claim 1, wherein the at least one slot is constructed and arranged to allow for a first degree of movement along the first axis, a second degree of movement along the second axis, and a third degree of movement along the third axis, and wherein the first degree of movement is greater than the second degree of movement and the third degree of movement.

3. The clean status indicator anchoring system of claim 2, wherein an inner periphery of the at least one slot and an outer periphery of the at least one second slide component are configured to form a clearance between the at least one slot and the at least one second slide component to allow for lateral movement of the at least one second slide component within the slot along the second axis to provide the second degree of movement of the dishwasher along the second axis.

4. The clean status indicator anchoring system of claim 3, wherein the clearance between the at least one slot and the at least one second slide component further allows for superior and inferior movement of the at least one second slide component within the slot along the third axis to provide the third degree of movement of the dishwasher along the third axis.

5. The clean status indicator anchoring system of claim 1, wherein the at least one first slide component further comprises at least one second slot defined therein, wherein the at least one second slot is parallel to the at least one first slot.

6. The clean status indicator anchoring system of claim 1, wherein the at least one slot comprises at least a first slot, a second slot, and a third slot, wherein the first slot, the second slot, and the third slot are parallel, and wherein the at least one second slide component comprises at least a first mechanical fastener, a second mechanical fastener, and a third mechanical fastener, and wherein the first mechanical fastener is disposed within the first slot, the second mechanical fastener is disposed within the second slot, and the third mechanical fastener is disposed within the third slot.

7. The clean status indicator anchoring system of claim 1, wherein the at least one first slide component comprises a moveable mounting bracket having a first plate and a second plate moveably secured to the first plate, wherein the first plate includes a first leg, a second leg, and a third leg stepped between the first leg and the second leg, and the second plate is adjacent the third leg, and wherein the at least one slot is defined within one of the third leg or the second plate and the at least one second slide component comprises at least one pin.

8. The clean status indicator anchoring system of claim 7, wherein the second plate is adjacent an underside of the third leg between a first lip extending between the first leg and the third leg and a second lip between the second leg and the third leg.

9. The clean status indicator anchoring system of claim 7, wherein the at least one first slide component further comprises an "L" shaped bracket secured to the movable mounting bracket, the "L" shaped mounting bracket having a first leg and a second leg perpendicular to the first leg, wherein the first leg has a first length and the second leg has a second length less than the first length, wherein at least one second slot is defined within the first leg, and wherein the at least one pin is further disposed within the at least one second slot.

10. The clean status indicator anchoring system of claim 7, wherein the at least one first slide component further comprises a first "L" shaped bracket having a first leg and a second leg perpendicular to the first leg, the first leg having a first length and the second leg having a second length less than the first length, and at least one second slot defined within the first leg, and a second "L" shaped bracket moveably secured to the first "L" shaped bracket, the second "L" shaped bracket having a third leg and a fourth leg perpendicular to the third leg, wherein an outer surface of the fourth leg of the second "L" shaped bracket and an inner surface of the second leg of the first "L" shaped bracket define a gap, and wherein the at least one pin is further disposed within the at least one second slot.

11. The clean status indicator anchoring system of claim 1, wherein the at least one first slide component comprises an "L" shaped bracket having a first leg and a second leg perpendicular to the first leg, wherein the first leg has a first length and the second leg has a second length less than the first length, and wherein the at least one slot is defined within the first leg.

12. The clean status indicator anchoring system of claim 11, wherein the at least one first slide component further comprises a second "L" shaped bracket having a third leg and a fourth leg perpendicular to the third leg, wherein the second "L" shaped bracket is adjustably secured to the first "L" shaped bracket, and wherein an outer surface of the fourth leg of the second "L" shaped bracket and an inner surface of the second leg of the first "L" shaped bracket define a gap.

13. The clean status indicator anchoring system of claim 1, wherein the at least one first slide component comprises a mounting bracket having a top wall, a bottom wall opposite of the top wall, and a side wall at a first end of the top wall and the bottom wall, wherein the top wall and the bottom wall define the at least one slot, wherein at least a first support structure and a second support structure extend through opposing sides of the top wall and the bottom wall, and wherein the at least one second slide component comprises an "L" shaped bracket configured to slide within the a least one slot and the at least first support structure and the second support structure.

14. The clean status indicator anchoring system of claim 1, wherein the controlled degree of movement of the dishwasher along the at least first axis is between at least $1/8^{th}$ of an inch and 1 inch of fore/aft movement.

15. A device having a clean status indicator system comprising:

the device, wherein the device comprises a frame with a base, a plurality of feet secured to the base, a washing compartment within the frame, a door adjacent the washing compartment, and at least one rack positioned within the washing compartment;

at least one weight sensor secured to at least one of the plurality of feet;

at least one temperature sensor in operative communication with the device;

a housing in operative communication with a visual display, wherein the housing is adjacent the washing compartment;

a controller having a control logic in operative communication with a power supply, the at least one weight sensor, the at least one temperature sensor, and the visual display, wherein the controller is constructed and arranged to receive data from the at least one weight sensor and the at least one temperature sensor and analyze the data from the at least one weight sensor and the at least one temperature sensor; and at least one first slide component having at least one slot defined therein, and at least one second slide component disposed within the at least one slot configured to move in relation to the at least one first slide component along at least a first axis extending along a length of the at least one slot, a second axis extending along a width of the at least one slot, and a third axis extending perpendicular to the first axis and the second axis, wherein at least one of the at least one first slide component and the at least one second slide component is secured adjacent to a surface of the device and a rigid support structure immediately adjacent the device, and wherein a length of the slot is perpendicular to a top edge of the device, and wherein at least one of the at least one first slide component and the at least one second slide component allow for movement of the device along the first axis, the second axis, and the third axis.

16. The device having a clean status indicator system of claim 15, wherein the at least one first slide component is rigidly secured to the device and the at least one second slide component is secured to the rigid support structure immediately adjacent to the device, and wherein the at least one second slide component is configured to move within the slot to allow for movement of the device along the first axis, the second axis, and the third axis.

17. The device having a clean status indicator system of claim 15, wherein the at least one first slide component and the at least one second slide component are rigidly secured to the rigid support structure immediately adjacent to the device, and wherein at least a portion of the at least one first slide component fits within a gap defined within the surface of the device and moves within the gap to allow for the movement of the device along the first axis, the second axis, and the third axis.

18. The device having a clean status indicator system of claim 15, wherein the controlled degree of movement of the device along the at least first axis is between at least $1/8^{th}$ of an inch and 1 inch of fore/aft movement.

19. A method for monitoring a clean/dirty status of a device comprising:

securing the device to a rigid support structure immediately adjacent to a surface of the device using at least one first slide component having at least one slot defined therein and at least one second slide component disposed within the at least one slot, positioning the at least one first slide component so that a length of the at least one slot is perpendicular to a front edge of the device, and wherein the first slide component and the second slide component allow for movement of the device along a first axis extending along the length of the at least one slot, a second axis extending along a width of the at least one slot, and a third axis perpendicular to the first axis and the second axis;

securing at least one weight sensor to the device;

providing at least one temperature sensor in operative communication with the device; providing a housing having a visual display, wherein the housing is adjacent a washing compartment of the device;

providing a controller having a control logic in operative communication with a power supply, the at least one weight sensor, the at least one temperature sensor, and the visual display; and monitoring at least one condition of the device using the at least one weight sensor and the at least one temperature sensor and sending data of the at least one condition to a status logic in the controller and using the control logic to evaluate whether one or more contents within the washing compartment of the device are clean or dirty, and displaying a status of the device on the visual display.

20. The method of claim 19, wherein the at least one slot is constructed and arranged to allow for a first degree of movement along the first axis, a second degree of movement along the second axis, and a third degree of movement along the third axis, and wherein the first degree of movement is greater than the second degree of movement and the third degree of movement.

21. The method of claim 19, further comprising providing a clearance between the at least one second slide component and the at least one slot to at least one of reduce friction between the at least one second slide component and the at least one slot and to allow for movement of the at least one second slide component along at least one of the first axis, the second axis, and the third axis.

22. The method of claim 19, further comprising securing at least one third slide component to at least one of the first slide component, the at least one second slide component, the surface of the device, and the rigid support structure to allow for further movement of the device.

* * * * *